United States Patent [19]

Althoff et al.

[11] 4,235,628
[45] Nov. 25, 1980

[54] AL-MN ALLOY AND PROCESS OF MANUFACTURING SEMIFINISHED PRODUCTS HAVING IMPROVED STRENGTH PROPERTIES

[75] Inventors: Heinz J. Althoff, Oberursel; Heinz Lommel, Neu-Anspach, both of Fed. Rep. of Germany

[73] Assignee: Metallgesellschaft Aktiengesellschaft, Frankfurt am Main, Fed. Rep. of Germany

[21] Appl. No.: 965,227

[22] Filed: Nov. 30, 1978

[30] Foreign Application Priority Data

Dec. 8, 1977 [DE] Fed. Rep. of Germany ....... 2754673

[51] Int. Cl.³ .................. C22C 21/02; C22F 1/04
[52] U.S. Cl. ................................. 75/148; 75/142; 75/143; 75/147; 148/2; 148/11.5 A; 148/32
[58] Field of Search ............. 148/2, 11.5 A, 32; 75/148, 147, 143, 142

[56] References Cited

U.S. PATENT DOCUMENTS

| | | | |
|---|---|---|---|
| 4,033,794 | 7/1977 | Stowell et al. | 148/11.5 A |
| 4,137,102 | 1/1979 | Althoff et al. | 148/11.5 A |

*Primary Examiner*—R. Dean
*Attorney, Agent, or Firm*—Sprung, Felfe, Horn, Lynch & Kramer

[57] ABSTRACT

An Al-Mn alloy which can be brazed and enamelled, has a high resistance to corrosion and in a completely recrystallized state has an ultimate tensile stress of at least 150 N/mm²; a process for producing such an Al-Mn alloy by forming a melt comprising 0.8 to 2 weight percent manganese, 1.40 to 3 weight percent silicon, 0.2 to 1 weight percent iron, 0 to 0.2 weight percent copper, 0 to 0.2 weight percent magnesium, balance aluminum and in a total up to 0.2 by weight inevitable impurities which are due to the manufacture, casting said melt to form an ingot, annealing said ingot to 400° to 620° C. for 2 to 20 hours, hot-rolling and cold-rolling said ingot to final dimensions of the semifinished product, and subsequently annealing the semifinished product at a temperature above 450° C.

19 Claims, 2 Drawing Figures

CHART I

ULTIMATE TENSILE STRESS AND YIELD POINT AFTER A PROCESS ANNEAL OF 2 HOURS (EXAMPLE 2)

AL-MN ALLOY AND PROCESS OF MANUFACTURING SEMIFINISHED PRODUCTS HAVING IMPROVED STRENGTH PROPERTIES

This invention relates to a process of manufacturing semifinished products which can be brazed and enamelled and have improved strength properties from an Al-Mn alloy.

Figure 1:
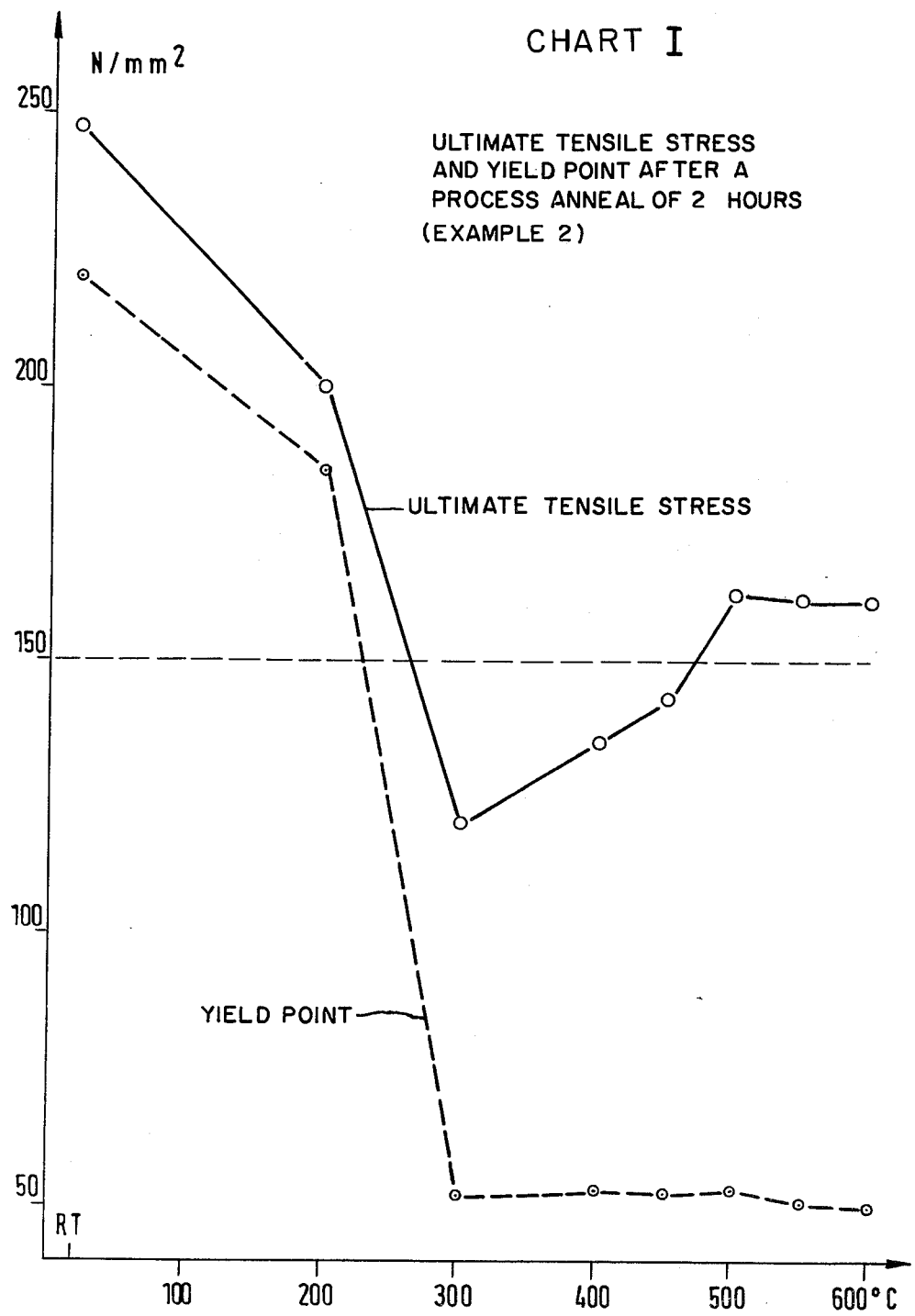
FIG. 1 shows ultimate tensile stress and yield point values after a process anneal of 2 hours.
Figure 2:
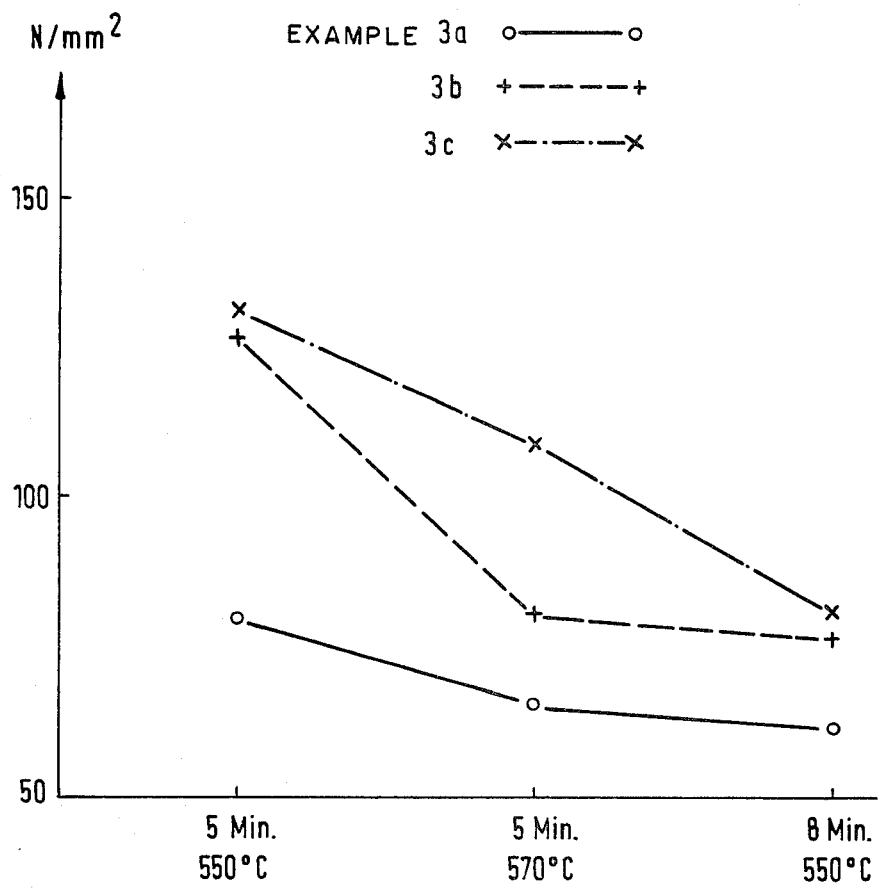
FIG. 2 shows yield point values after process anneal, 17% cold-forming and short-time anneal.

Semifinished products are described as being brazable and enamellable if they do not require an expensive pretreatment by chromating, anodizing, cladding, electroplating or the like other than a degreasing in case of need. Within the scope of this application the term "improved strength properties" refers particularly to a higher ultimate tensile stress of the structure which is recrystallized so that it is thermodynamically stable. In that state, which is also described as "soft", the semifinished products should have an ultimate tensile stress of at least 150 N/mm$^2$.

Deutsche Industrie Norm 1725 in conjunction with Deutsche Industrie Norm 1745, in the editions of December 1976, describe in their respective Parts 1 as Material No. 3.0515 an Al-Mn alloy which in the soft state has an ultimate tensile stress of at least 90 N/mm$^2$. Higher ultimate tensile stresses in the soft state can be obtained in Al-Mn alloys by an addition of Cu (DIN 1745, Material No. 3.0517) or Mg (Material No. 3.0526). In the first case the ultimate tensile stress is only moderately increased to 100 N/mm$^2$. In the second case the ultimate tensile stress is increased to at least 155 N/mm$^2$.

These two measures to increase the strength result in disadvantages in other respects. The addition of 0.05 to 0.20% Cu results in an only small improvement in strength but in a considerable decrease of the resistance to corrosion. An Al-Mn alloy which contains 0.8 to 1.3 Mg can no longer be brazed or enamelled. It is apparent that the requirements stated first hereinbefore cannot all be met at the same time in this manner.

Al-Mn alloys are known which can be brazed and enamelled and have improved strength properties and a field of application which has been increased by an addition of zirconium and/or chromium. (See German Patent Specification Nos. 1,608,198; 1,608,766; German Patent Publication No. 2,529,064; Opened German Specification No. 2,555,095). In these cases only a recrystallization-inhibiting structure is produced so that the decrease in strength is shifted to higher temperatures. When the material is in the "soft" state which has been called for, the lowest ultimate tensile stresses of these alloys lie also distinctly under the desired value.

During the manufacture of parts made from such alloys, e.g., during brazing and enamelling operations, or during their intended use, the parts will withstand higher temperatures than conventional Al-Mn alloys because the addition of Zr and/or Cr prevents an appreciable decrease at elevated temperatures of the strength increase which has been effected by cold-working. On the other hand, recrystallization is inhibited only up to a certain temperature and/or time of action. If certain limits are exceeded during the manufacture of the parts or during their intended use, the structure of such alloys often changes to a thermodynamically stable, soft state, in which the strength values are no longer adequate for numerous applications.

This phenomenon cannot be reversed in most cases. This will easily be understood as regards articles which are permanently used at or above the recrystallization temperature. Enamelled or brazed articles, which often are subjected to the critical temperatures only for a short time, either cannot be subsequently cold-formed to all to increase their ultimate tensile stresses (because the enamel would chip off) or cannot be cold-formed in practice owing to the intricate shape of the articles (e.g., brazed automobile radiators).

For this reason it is an object of the invention to provide semifinished products which consist of an Al-Mn alloy and can be brazed and enamelled, have a high resistance to corrosion and even in a complete recrystallized state still have an ultimate tensile stress of at least 150 N/mm$^2$.

This object is accomplished according to the invention in that in the manufacture of semifinished products a melt consisting of:

0.8 to 2 weight percent manganese
0.6 to 3 weight percent silicon
0.2 to 1 weight percent iron
0 to 0.2 weight percent copper
0 to 0.2 weight percent magnesium
balance aluminum and up to 0.2% by weight inevitable impurities which are due to the manufacture is continuously cast to form an ingot, which is annealed at 400° to 620° C. for 2 to 20 hours and is then hot- and cold-formed to the final dimensions of the semifinished product, and the semifinished product is finally process-annealed at a temperature above 450° C.

Suitably a starting alloy is used which is contaminated with less than 0.01% by weight of any one of the elements zinc, lead, chromium, nickel, tin, cadmium and bismuth. The weight ratio of silicon to iron is desirably selected within the range of 1:1 to 6:1, preferably of 2:1 to 4:1. The total contents of manganese and silicon should amount to at least 2%, preferably 2.5 to 3.5% by weight.

The continuously cast ingot can be annealed at 400° to 500° C.

If the semifinished products or the articles made therefrom are required to have recrystallization-inhibiting structure, the ingot is annealed at 400° to 500° C. for 4 to 20 hours and after the hot- and cold-forming and the final annealing, the semifinished product is subjected to further cold-forming or articles are made from the semifinished product by cold-forming. The resistance to recrystallization can be further increased in that a starting alloy is used which in known manner contains also up to 0.5% by weight zirconium.

It will be understood that a melt having the composition according to the invention can be continuously cast to form a cast strip having a thickness of 5 to 60 mm. To obtain the desired properties that cast strip must then be subjected to the treatment which has been described hereinbefore for an ingot. If the cast strip is hot rolled directly from the casting temperature, the above-mentioned high-temperature anneal may possibly be omitted. On the other hand it is essential to process-anneal the hot- and cold-rolled material at a temperature above 450° C.

If the cast strip need not be hot-rolled, it may be annealed for 2 to 20 hours at 500° to 620° C. in order to obtain a fine final structure and may then be cooled and cold-rolled or may be cold-rolled without a previous anneal, and the cold-rolled strip may be process-annealed.

Cast strips may also be treated to have an only slowly recrystallizable structure.

The semifinished products according to the invention may be used for purpose for which the requirements stated first hereinbefore must be fulfilled, particularly for purposes in which the recrystallized material is required to have an ultimate tensile stress of at least 150 N/mm². The products can be excellently brazed and enamelled without a special pretreatment, e.g., by chromating, anodizing, cladding, electroplating etc. A conventional treatment to remove rolling oils or greases or lubricants used in the forming operations is sufficient.

Specifically, the semifinished products may be used in the manufacture of brazed heat exchangers and other brazed articles as facing material and as core material for brazed clad strip and sheet metal. They may be used in the manufacture of enamelled articles, such as kitchen utensils, also in the manufacture of absorber plates for solar collectors in which said absorber plates may be subjected to considerable temperature stresses under no-load conditions. Possible uses for a continuous exposure to high temperature are, e.g., exhaust systems for internal-combustion engines, shell-and-tube heat exchangers and heat pipe heat exchangers. Finally, the semifinished products may be used in the manufacture of sheet metal car bodies, which are also required to have a high ultimate tensile stress in a recrystallized state because they are provided with a baked enamel finish.

Finally, the aluminum alloy can be used with excellent results in the manufacture of cold-extruded parts because in a recrystallized state the alloy has a ratio of ultimate tensile stress to yield point of about 3:1 or higher.

Further details and advantages of the invention will now be explained with reference to the following test results:

1. A melt having the following analysis:
1.49% manganese
1.63% silicon
0.53% iron
0.08% copper
0.02% titanium
<0.01% magnesium
<0.01% zinc
<0.01% lead
<0.01% chomium
<0.01% zirconium
balance aluminum was continuously cast to form an ingot, which is annealed at 550° C. for 15 hours. The ingot was then hot-rolled at 530° to effect a reduction in area of 95% and was subsequently cold-rolled to effect a reduction in area of 70%.

Samples taken from the resulting strip were process-annealed at 500° and 600° C., respectively, for 2 hours. When tested, the samples were found to have the following strength properties:

|  | Annealing Temperature | |
|---|---|---|
|  | 500° C. | 600° C. |
| Ultimate tensile stress, N/mm² | 164 | 150 |
| 0.2% yield point N/mm² | 53 | 50 |
| A₁₀ Elongation at break, % | 25 | 28 |

It is apparent that the required ultimate tensile stress of 150 N/mm² in a recrystallized state was obtained in conjunction with considerable values for the elongation at break and a ratio of ultimate tensile stress to yield point in excess of 3:1. This ratio is particularly significant for the cold extrusion of the material.

2. A melt having the following analysis:
1.44% manganese
1.49% silicon
0.48% iron
<0.2% other constituents
balance aluminum was used just as in Example 1 to make an ingot, which was hot- and cold-rolled in the same manner. The samples taken were process-annealed at different temperatures for 2 hours. The ultimate tensile stress and yield point values which were subsequently determined are represented in Chart I.

It is apparent that the ultimate tensile stress steeply decreases from about 250 N/mm² at room temperature in the cold-hardened state to about 120 N/mm² after an anneal at temperatures up to 300° C. and increases to values above 150 N/mm² after an anneal above 300° C. The value of 150 N/mm² is exceeded when the anneal has been effected at a temperature between 450° and 500° C. The rise of the ultimate tensile stress in a recrystallized state after an anneal above 300° C. is entirely surprising because the known aluminum alloys have exhibited only progressively lower ultimate tensile stresses after a process-anneal at increasing temperatures and because particularly the yield point does not exhibit a corresponding rise.

3. The recrystallization-inhibiting effect of a modified pretreatment of the ingot having the composition stated in Example 2 and of another ingot was investigated. The latter ingot had the following composition:
1.45% manganese
1.40% silicon
0.57% iron
0.14% zirconium
<0.2% other constituents
balance aluminum A comparison was made between:

(a) A sample which was treated in accordance with Example 2 and additionally cold-formed 17% after the process annealing;

(b) A sample of a material which was obtained from an ingot that had been annealed at 470° C. for 12 hours, followed by a treatment as stated for sample (a);

(c) A sample of a material having the composition stated above, i.e., containing 0.14% zirconium, and treated as stated for sample (b).

All three samples (a) to (c) were annealed for different, short periods of time after having been cold-formed 17%. This simulates a manufacturing operation such as used in baking the porcelain enamel on kitchen utensils.

The results are shown in Chart II. The 0.2% yield points of all three samples are initially 185 N/mm². After the short-time anneals indicated on the chart and corresponding to the baking of porcelain enamel, the yield point of sample (a) decreases to values between 80 and 63 N/mm².

The limiting values of the yield points of sample (b) are 127 N/mm² after the first anneal, 81 N/mm² after the second anneal, and 77 N/mm² after the third anneal.

Even more favorable results are obtained under these experimental conditions with sample (c). This is less surprising because zirconium is known to inhibit recrystallization. A more significant recognition resides in that the recrystallization can be considerably inhibited under the stated conditions even without an addition of zirconium. During the first and third anneals this inhibition is only insignificantly lower than the inhibition effected with the addition of zirconium.

It is believed that a further improvement of the pretreatment of the alloy according to the invention will result throughout the range of the possible short-time temperature rises, such as baking of enamel or brazing, in a strong recrystallization-inhibiting effect, which was previously achieved only by an addition of zirconium or other elements. As a result, the detrimental effects of these additives regarding enamelling and corrosion can be avoided.

The process according to the invention provides an aluminum material which has an excellent ultimate tensile stress in the recrystallized state but after a suitable pretreatment will have a structure which inhibits recrystallization without need for an addition of elements which are detrimental in other respects. Owing to these properties, the alloy has wide fields of application.

What is claimed is:

1. An Al-Mn alloy which can be brazed and enamelled, has a high resistance to corrosion and in a completely recrystallized state has an ultimate tensile stress of at least 150 N/mm², said alloy consisting essentially of:
   0.8 to 2 weight percent manganese
   1.40 to 3 weight percent silicon
   0.2 to 1 weight percent iron
   0 to 0.2 weight percent copper
   0 to 0.2 weight percent magnesium,
   the balance being aluminum with up to 0.2 weight percent impurities.

2. An alloy according to claim 1 containing less than 0.01 percent by weight any one of the elements zinc, lead, chromium, nickel, tin, cadmium and bismuth.

3. An alloy according to claim 1 wherein the weight ratio of silicon to iron is 1-6:1.

4. An alloy according to claim 3 wherein the weight ratio of to iron is 2-:1.

5. An alloy according to claim 3 wherein the total content of manganese and silicon is at least 2 percent.

6. An alloy according to claim 5 wherein the total content of manganese and silicon is 2.5 to 3.5 weight percent.

7. An alloy according to claim 1 containing up to 0.5 weight percent zirconium.

8. A semi-finished product of the alloy of claim 1.

9. A process for the manufacture of a semi-finished product which can be brazed and enamelled, has improved strength properties which comprises:
   a. forming a melt consisting essentially of
      0.8 to 2 weight percent manganese
      1.40 to 3 weight percent silicon
      0.2 to 1 weight percent iron
      0 to 0.2 weight percent copper
      0 to 0.2 weight percent magnesium, the balance being aluminum with up to 0.2 weight percent impurities;
   b. casting said melt to form an ingot;
   c. annealing said ingot at a temperature of 400° to 620° C. for 2 to 20 hours;
   d. hot-forming and cold-forming said annealed ingot to final dimensions of the semi-product; and
   e. annealing the so-formed semi-product at a temperature above 450° C.

10. A process according to claim 9 wherein the melt contains less than 0.01 weight percent of any one of the elements zinc, lead, chromium, nickel, tin, cadmium and bismuth.

11. A process according to claim 9 wherein the weight ratio of to iron in the melt is in the range of 1-6:1.

12. A process according to claim 11 wherein the weight ratio of silicon to iron is 2-:1.

13. A process according to claim 9 wherein the total content of maganese and silicon in the melt is at least 2%.

14. A process according to claim 13 wherein the total content of maganese and silicon is 2.5 to 3.5 weight percent.

15. A process according to claim 9 wherein said ingot is annealed at a temperature of 500° to 620° C.

16. A process according to claim 9 wherein the ingot is annealed at a temperature of 400° to 500° C. for 2 to 20 hours.

17. A process according to claim 9 wherein said ingot is annealed at a temperature of 400° to 500° C. for 4 to 20 hours and following the final annealing at a temperature above 450° C. the product is subjected to further cold-forming or articles are made from the semifinished product by cold-forming.

18. A process according to claim 17 wherein said melt contains up to 0.5 weight percent zirconium.

19. A process according to claim 9 wherein said melt is continuously cast to form an ingot.

* * * * *

UNITED STATES PATENT AND TRADEMARK OFFICE
CERTIFICATE OF CORRECTION

PATENT NO. : 4,235,628
DATED : November 25, 1980
INVENTOR(S) : Heinz Jürgen Althoff ; Heinz Lommel It is certified that error appears in the above-identified patent and that said Letters Patent are hereby corrected as shown below:

| Column | Line | |
|---|---|---|
| 5 | 53 | delete "to iron is 2-:1" and insert -- "silicon to iron is 2-4:1" -- |
| 6 | 30 | insert "silicon" before "to" |
| 6 | 33 | delete "2-:1" and insert -- "2-4:1" -- |

Signed and Sealed this

Fourteenth Day of April 1981

[SEAL]

Attest:

RENE D. TEGTMEYER

Attesting Officer    Acting Commissioner of Patents and Trademarks